United States Patent
Kim et al.

(10) Patent No.: US 8,452,322 B2
(45) Date of Patent: May 28, 2013

(54) METHOD FOR CONTROLLING UPLINK TRANSMISSION POWER IN WIRELESS COMMUNICATION SYSTEM AND AN APPARATUS THEREFOR

(75) Inventors: Dong Cheol Kim, Anyang-si (KR); Han Gyu Cho, Anyang-si (KR); Jin Sam Kwak, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 13/139,702

(22) PCT Filed: Jan. 25, 2010

(86) PCT No.: PCT/KR2010/000452
§ 371 (c)(1),
(2), (4) Date: Jun. 14, 2011

(87) PCT Pub. No.: WO2010/090408
PCT Pub. Date: Feb. 12, 2010

(65) Prior Publication Data
US 2011/0250912 A1   Oct. 13, 2011

Related U.S. Application Data

(60) Provisional application No. 61/149,849, filed on Feb. 4, 2009, provisional application No. 61/156,885, filed on Mar. 3, 2009, provisional application No. 61/173,218, filed on Apr. 28, 2009.

(51) Int. Cl.
*H04W 52/04* (2009.01)

(52) U.S. Cl.
USPC ........... 455/522; 455/69; 455/67.11; 455/501

(58) Field of Classification Search
USPC .......... 455/522, 69, 452.1, 452.2, 509, 67.11, 455/67.13, 126, 63.1, 500, 501, 507; 370/329
See application file for complete search history.

(56) References Cited

U.S. PATENT DOCUMENTS

| | | |
|---|---|---|
| 2005/0037795 A1 | 2/2005 | Aaltonen et al. |
| 2008/0102879 A1 | 5/2008 | Heo et al. |
| 2010/0020757 A1* | 1/2010 | Walton et al. .................. 370/329 |
| 2011/0002279 A1* | 1/2011 | Yang et al. .................... 370/329 |

FOREIGN PATENT DOCUMENTS

| | | |
|---|---|---|
| KR | 10-2007-0117125 | 12/2007 |
| WO | 2005/050893 | 6/2005 |

* cited by examiner

*Primary Examiner* — John J Lee
(74) *Attorney, Agent, or Firm* — Lee, Hong, Degerman, Kang & Waimey

(57) ABSTRACT

A method for setting uplink transmission power at a mobile station in a wireless communication system comprises the steps of: receiving information on the number of total streams received at a base station; and setting the uplink transmission power using the received number of total streams. In this case, the uplink transmission power is preferably a transmission power per stream ($P_{Tx\_stream}$) obtained by applying the number of total streams to reference transmission power ($P_{Tx\_ref}$).

14 Claims, 8 Drawing Sheets

METHOD FOR CONTROLLING UPLINK TRANSMISSION POWER IN WIRELESS COMMUNICATION SYSTEM AND AN APPARATUS THEREFOR

CROSS-REFERENCE TO RELATED APPLICATIONS

This application is the National Stage filing under 35 U.S.C. 371 of International Application No. PCT/KR2010/000452, filed on Jan. 25, 2010, which claims the benefit of U.S. Provisional Application Ser. Nos. 61/173,218, filed on Apr. 28, 2009, 61/156,885, filed on Mar. 3, 2009, and 61/149,849, filed on Feb. 4, 2009, the contents of which are all hereby incorporated by reference herein in their entirety.

TECHNICAL FIELD

The present invention relates to a wireless communication system, and more particularly, to a method for controlling uplink transmission power of a mobile station in a wireless communication system and an apparatus therefor.

BACKGROUND ART

FIG. 1 is a diagram illustrating a wireless communication system. Referring to FIG. 1, a wireless communication system 100 includes a plurality of base stations 110 and a plurality of mobile stations 120. The wireless communication system 100 can include a homogeneous network or heterogeneous network. In this case, a network where different network entities coexist, such as a macro cell, a femto cell, a pico cell, and a relay station, is designated as the heterogeneous network. The base stations are fixed stations that perform communication with a mobile station. Each of the base stations 110a, 110b, and 110c provides a service to specific local regions 102a, 102b, and 102c. In order to improve system throughput, the specific regions can be divided into a plurality of smaller regions 104a, 104b and 104c. Each of the smaller regions may be designated as a cell, sector or segment. In case of the IEEE 802.16 system, cell identity (Cell_ID or IDCell) is given based on the whole system. On the other hand, sector or segment identity is given based on the specific region where each base station provides a service, and has a value of 0 to 2. The mobile stations 120 can generally be distributed, fixed or moved in the wireless communication system. Each mobile station can perform communication with one or more base stations through an uplink (UL) and a downlink (DL) at a random time. The base station and the mobile station can perform communication with each other by using FDMA (Frequency Division Multiple Access), TDMA (Time Division Multiple Access), CDMA (Code Division Multiple Access), SC-FDMA (Single Carrier-FDMA), MC-FDMA (Multi Carrier-FDMA), OFDMA (Orthogonal Frequency Division Multiple Access) or their combination. Herein, the uplink means a communication link from the mobile station to the base station while the downlink means a communication link from the base station to the mobile station.

DISCLOSURE

Technical Problem

Accordingly, the present invention is directed to a method for controlling uplink transmission power in a wireless communication system and an apparatus therefor, which substantially obviate one or more problems due to limitations and disadvantages of the related art.

An object of the present invention is to provide a method for controlling uplink transmission power in a wireless communication system and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for setting uplink transmission power at a mobile station in a wireless communication system comprises the steps of: receiving information on the number of total streams received at a base station; and setting the uplink transmission power using the received number of total streams. In this case, the uplink transmission power is preferably a transmission power per stream ($P_{Tx\_stream}$) obtained by applying the number of total streams to reference transmission power ($P_{Tx\_ref}$).

Also, the number of total streams received at the base station is larger than the number of streams which are transmitted from the mobile station.

Preferably, the transmission power per stream ($P_{Tx\_stream}$) is obtained by dividing the reference transmission power ($P_{Tx\_ref}$) by the number of total streams.

More preferably, the reference transmission power ($P_{Tx\_ref}$) comprises target signal to interference and noise power ratio($SINR_{Target}$), and the transmission power per stream ($P_{Tx\_stream}$) comprises target signal to interference and noise power ratio per stream ($SINR_{Target\_stream}$).

Also, the number of total streams is received through UL A-MAP IE (Uplink Advanced-MAP Information Element) of a superframe header.

In another aspect of the present invention, a mobile station in a wireless communication system comprises: a receiving module for receiving information on the number of total streams received at a base station; and a processor for setting uplink transmission power using the received number of total streams. In this case, the uplink transmission power is preferably a transmission power per stream ($P_{Tx\_stream}$) obtained by applying the number of total streams to reference transmission power ($P_{Tx\_ref}$).

Also, the number of total streams received at the base station is larger than the number of streams which are transmitted from the mobile station.

Preferably, the transmission power per stream ($P_{Tx\_stream}$) is obtained by dividing the reference transmission power ($P_{Tx\_ref}$) by the number of total streams.

More preferably, the reference transmission power ($P_{Tx\_ref}$) comprises target signal to interference and noise power ratio($SINR_{Target}$), and the transmission power per stream ($P_{Tx\_stream}$) comprises target signal to interference and noise power ratio per stream ($SINR_{Target\_stream}$).

Also, the number of total streams is received through UL A-MAP IE (Uplink Advanced-MAP Information Element) of a superframe header.

Advantageous Effects

According to the embodiments of the present invention, the mobile station in the wireless communication system can efficiently control the uplink transmission power.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to a system that uses a plurality of orthogonal subcarriers. For convenience, the present invention will be described based on the IEE 802.16 system. However, the IEEE 802.16 system is only exemplary, and the present invention can be applied to various wireless communication systems including a $3^{rd}$ generation partnership project (3GPP) system.

Figure 1:
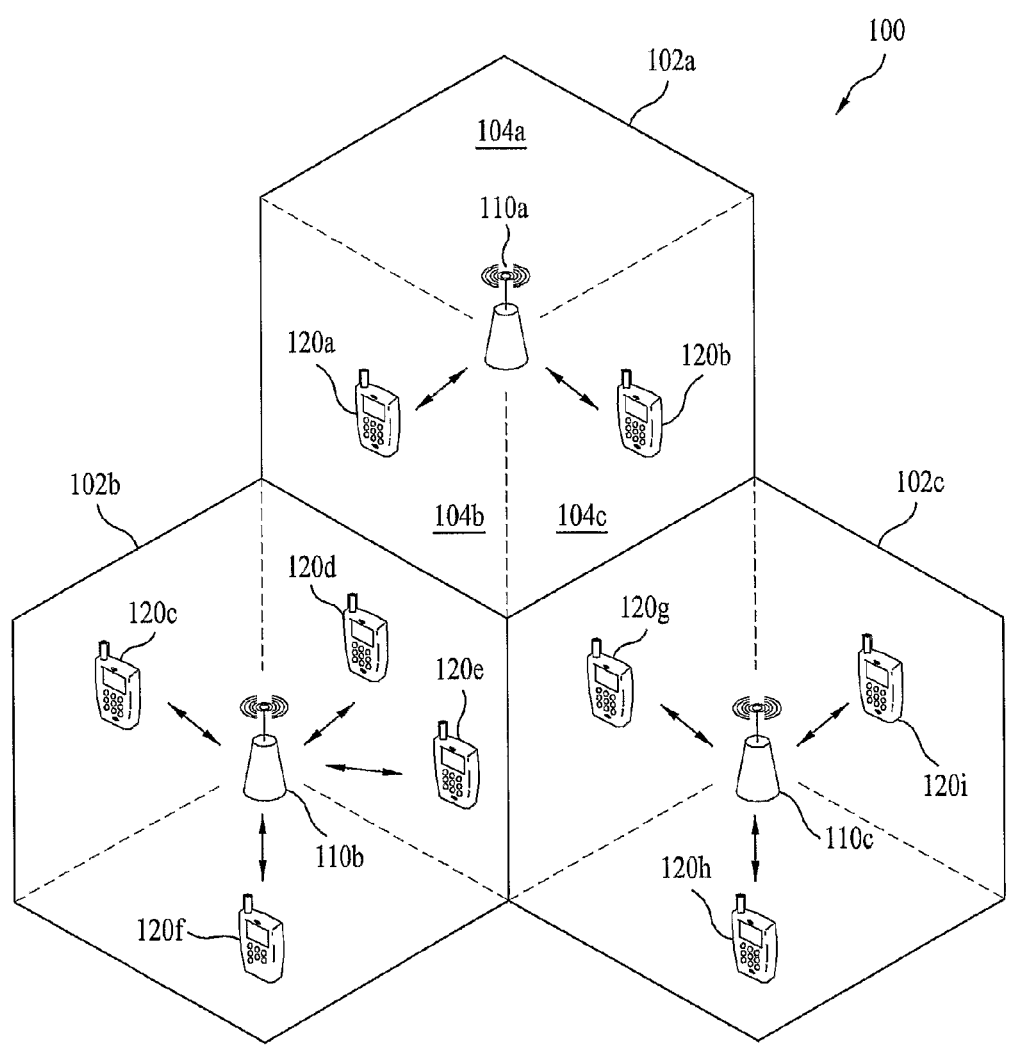
FIG. 1 is a diagram illustrating a wireless communication system.
Figure 2:
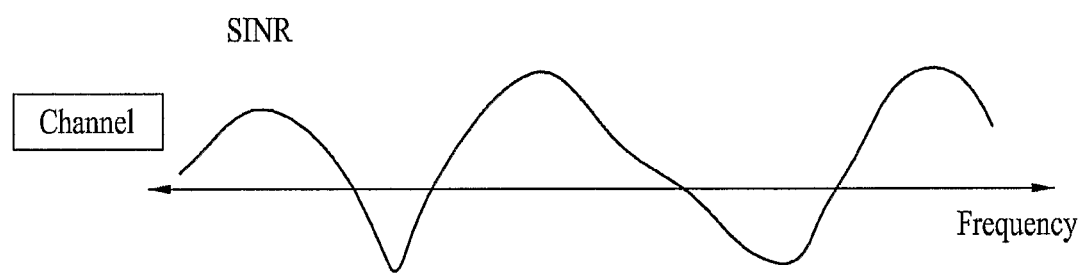
FIG. 2 is a diagram illustrating an example of channel change on a frequency in a wireless communication system.
Figure 3:
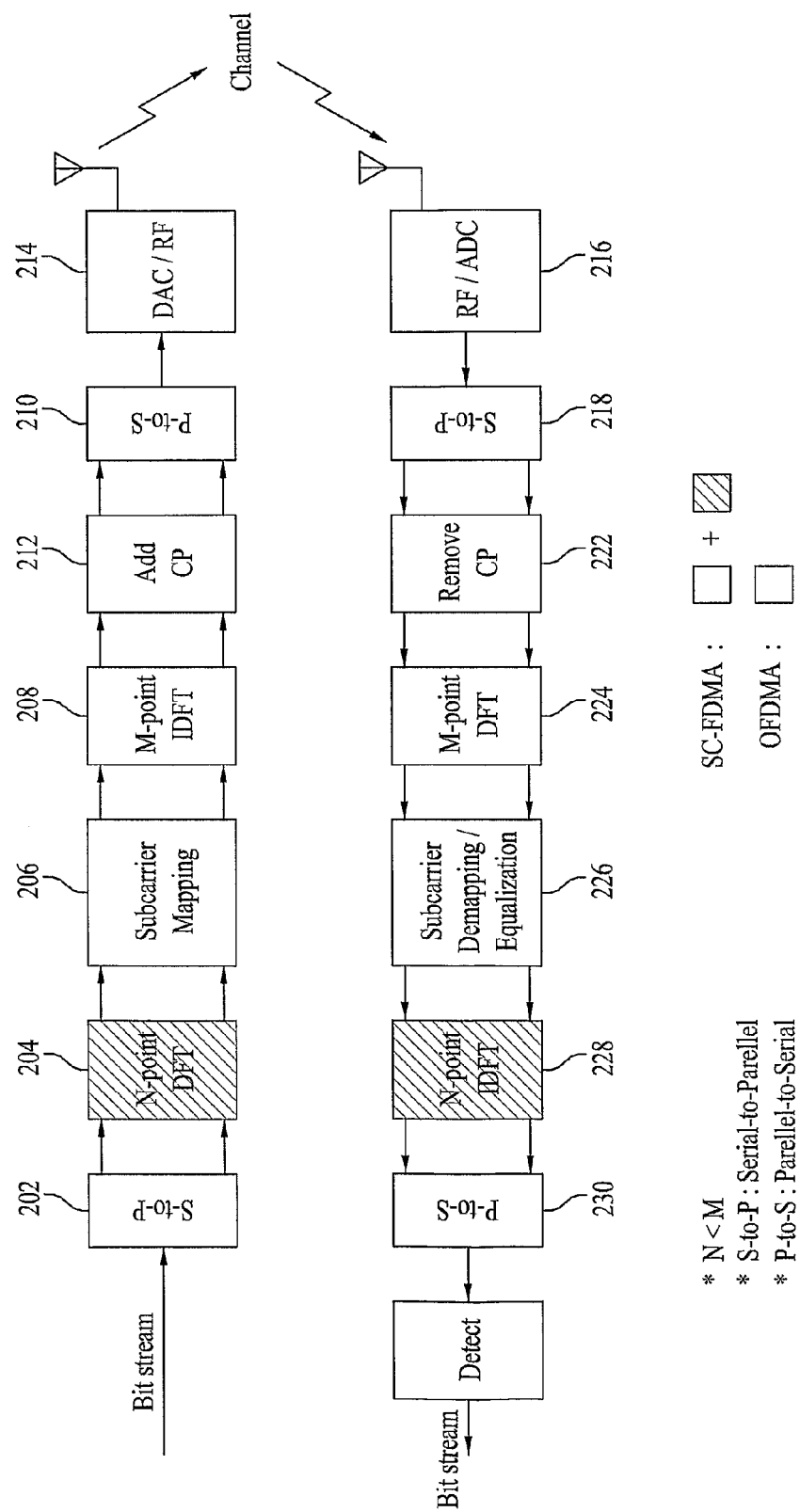
FIG. 3 is a diagram illustrating a transmitter and a receiver for OFDMA and SC-FDMA.

FIG. 3 is a block diagram illustrating a transmitter and a receiver for OFDMA and SC-FDMA. In an uplink, a transmitter may be a part of a mobile station, and a receiver may be a part of a base station. In a downlink, a transmitter may be a part of a base station, and a receiver may be a part of a mobile station.

Referring to FIG. 3, an OFDMA transmitter includes a serial to parallel converter 202, a sub-carrier mapping module 206, an M-point inverse discrete fourier transform (IDFT) module 208, a cyclic prefix (CP) addition module 210, a parallel to serial converter 212, and a radio frequency (RF)/digital to analog converter (DAC) module 214.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from a medium access control (MAC) layer. The bit streams may be designated as codewords, and are equivalent to the data block transferred from the MAC layer. The data block transferred from the MAC layer may be designated as a transmission block. Examples of a modulation scheme include, but not limited to, BPSK (binary phase shift keying), QPSK (quadrature phase shift keying), and n-QAM (quadrature amplitude modulation). The data symbol sequences in series are converted to parallel data symbol sequences as much as N (202). N number of data symbols are mapped with N number of subcarriers allocated among a total of M number of subcarriers, and the other M-N number of carriers are padded with 0 (206). The data symbols mapped in a frequency domain are converted to time region sequences through M-point IDFT processing (S208). Afterwards, in order to reduce inter-symbol interference (ISI) and inter-carrier interference (ICI), cyclic prefix is added to the time region sequences to generate OFDMA symbols (210). The generated OFDMA symbols are converted from parallel symbols to serial symbols (212). Then, the OFDMA symbols are transmitted to the receiver through digital-to-analog conversion and frequency uplink conversion (214). Other user is allocated with available subcarriers among the remaining M-N number of subcarriers. On the other hand, the OFDMA receiver includes an RF/ADC(analog to digital converter) module 216, a serial-to-parallel converter 218, a cyclic prefix (CP) removing module 220, an M-point discrete fourier transform (DFT) module 224, a subcarrier demapping/equalization module 226, a parallel-to-digital converter 228, and a detection module 230. A signal processing procedure of the OFDMA receiver will be configured in reverse order of the OFDMA transmitter.

Meanwhile, as compared with the OFDMA transmitter, the SC-FDMA transmitter additionally includes an N-point DFT module 204 prior to the subcarrier mapping module 206. The SC-FDMA transmitter can reduce a peak-to-average power ratio (PAPR) of a transmitting signal more remarkably than the OFDMA transmitter by spreading a plurality of data to the frequency domain through DFT prior IDFT processing. Also, as compared with the OFDMA receiver, the SC-FDMA receiver additionally includes an N-point IDFT module 228 after the subcarrier demapping module 226. A signal processing procedure of the SC-FDMA receiver will be configured in reverse order of the SC-FDMA transmitter.

The modules illustrated in FIG. 3 are illustrative, and the transmitter and/or the receiver may further include necessary modules. Some modules/functions may be omitted or may be divided into different modules, and two or more modules may be incorporated into one module.

Figure 4:
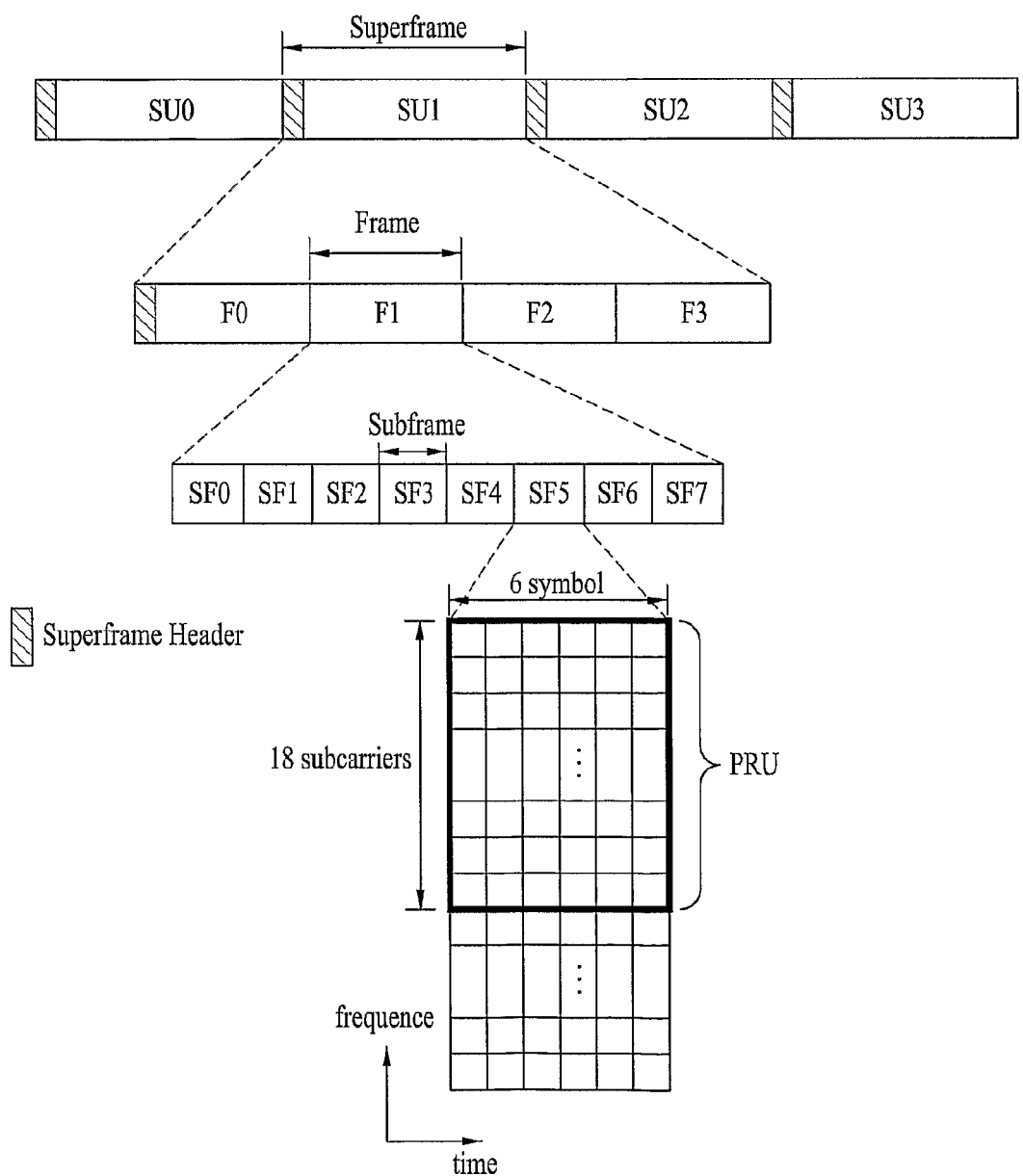
FIG. 4 is a diagram illustrating an example of a structure of a radio frame in an IEEE 802.16m system.

FIG. 4 is a diagram illustrating a structure of a radio frame in an IEEE 802.16m system. The structure of the radio frame can be applied to FDD(Frequency Division Duplex), H-FDD (Half Frequency Division Duplex), TDD(Time Division Duplex), etc.

Referring to FIG. 4, the radio frame includes superframes SU0 to SU3 of 20 ms that support a bandwidths of 5 MHz, 8.75 MHz, 10 MHz or 20 MHz. Each superframe includes four frames F0 to F3 of 5 ms having the same size, and starts with a super frame header (SFH). The super frame header carries essential system parameter and system configuration information. The super frame header can be located with the first subframe. The super frame header can be divided into a primary-SFH (P-SFH) and a secondary-SFH (S-SFH). The P-SFH is transmitted per super frame. The S-SFH can be transmitted per super frame. The super frame header can include a broadcast channel.

the OFDM symbols include BW, $N_{used}$, n, G, etc. The BW is a nominal channel bandwidth. $N_{used}$ is the number of subcarriers used for signal transmission. n is a sampling factor, and determines subcarrier spacing and useful symbol time together with BW and $N_{used}$. G is a ratio between CP time and useful time.

Table 1 illustrates an example of OFDMA parameters.

TABLE 1

| | | | The nominal channel bandwidth, BW (MHz) | | | | |
|---|---|---|---|---|---|---|---|
| | | | 5 | 7 | 8.75 | 10 | 20 |
| Sampling factor, n | | | 28/25 | 8/7 | 8/7 | 28/25 | 28/25 |
| Sampling frequency, $F_s$ (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$ (kHz) | | | 10.94 | 7.81 | 9.77 | 10.94 | 10.94 |
| Useful symbol time, $T_b$ (μs) | | | 91.4 | 128 | 102.4 | 91.4 | 91.4 |
| CP ratio, G = 1/8 | OFDMA symbol time, $T_s$ (μs) | | 102.857 | 144 | 115.2 | 102.857 | 102.857 |
| | FDD | Number of OFDMA symbols per 5 ms frame | 48 | 34 | 43 | 48 | 48 |
| | | Idle time (μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (μs) | 165.714 | 248 | 161.6 | 165.714 | 165.714 |
| CP ratio, G = 1/16 | OFDMA symbol time, $T_s$ (μs) | | 97.143 | 136 | 108.8 | 97.143 | 97.143 |
| | FDD | Number of OFDMA symbols per 5 ms frame | 51 | 36 | 45 | 51 | 51 |
| | | Idle time (μs) | 45.71 | 104 | 104 | 45.71 | 45.71 |
| | TDD | Number of OFDMA symbols per 5 ms frame | 50 | 35 | 44 | 50 | 50 |
| | | TTG + RTG (μs) | 142.853 | 240 | 212.8 | 142.853 | 142.853 |
| CP ratio, G = 1/4 | OFDMA symbol time, $T_s$ (μs) | | 114.286 | 160 | 128 | 114.286 | 114.286 |
| | FDD | Number of OFDMA symbols per 5 ms frame | 43 | 31 | 39 | 43 | 43 |
| | | Idle time (μs) | 85.694 | 40 | 8 | 85.694 | 85.694 |
| | TDD | Number of OFDMA symbols per 5 ms frame | 42 | 30 | 38 | 42 | 42 |
| | | TTG + RTG (μs) | 199.98 | 200 | 136 | 199.98 | 199.98 |
| Number of Guard Sub-Carriers | Left | | 40 | 80 | 80 | 80 | 160 |
| | Right | | 39 | 79 | 79 | 79 | 159 |
| Number of Used Sub-Carriers | | | 433 | 865 | 865 | 865 | 1729 |
| Number of Physical Resource Unit (18 × 6) in a type-1 sub-frame. | | | 24 | 48 | 48 | 48 | 96 |

Each frame includes eight subframes SF0 to SF7. The subframe is allocated for downlink or uplink transmission. The subframe includes a plurality of OFDM symbols in a time domain and a plurality of subcarriers in a frequency domain. The OFDM symbols may be referred to as OFDMA symbols or SC-FDMA symbols depending on a multiplexing access mode. The number of OFDM symbols included in the subframe can be varied depending on channel bandwidth and CP length. A type of the subframe can be defined depending on the number of OFDM symbols included in the subframe. For example, the type of the subframe can be defined in such a manner that subframe type-1 includes six OFDM symbols, subframe type-2 includes seven OFDM symbols, subframe type-3 includes five OFDM symbols, and subframe type-4 includes nine OFDM symbols. One frame may include the same type subframes or different types of subframes.

The OFDM symbol includes a plurality of subcarriers, and the number of subcarriers is determined depending on the size of fast fourier transform (FFT). The subcarriers can be divided into data subcarriers for data transmission, pilot subcarriers for channel measurement, and null subcarriers for guard band and DC components. Examples of parameters for The subframe includes a plurality of physical resource units (PRUs) in the frequency domain. The PRU is a basic unit for resource allocation, and includes a plurality of continuous OFDM symbols in the time domain and a plurality of continuous subcarriers in the frequency domain. For example, the number of OFDM symbols within the PRU may be the same as that number of OFDM symbols included in the subframe. Accordingly, the number of OFDM symbols within the PRU can be determined depending on the type of the subframe. Meanwhile, the number of subcarriers within the PRU may be 18. In this case, the PRU includes 6 OFDM symbols×18 subcarriers. The PRU can be designated as a distributed resource unit (DRU) or a contiguous resource unit (CRU) depending on resource allocation type.

The aforementioned structure is only exemplary. Accordingly, various modifications can be made in the length of the superframe, the number of subframes included in the superframe, the number of OFDMA symbols included in the subframe, and parameters of OFDMA symbols. For example, the number of subframes included in the frame can be varied depending on the channel bandwidth and the CP length.

Generally, the power for transmitting an uplink signal from the mobile station is controlled only if one user transmits an uplink signal using one resource region regardless of the number of users. Namely, the transmission power is controlled provided that the base station is operated in a single input multi output (SIMO) mode. However, when two or more users transmit the uplink signal through the same resource region, if the transmission power of the mobile station is controlled in the same manner as the related art even in a multi user-multi input multi output (MU-MIMO) mode such as collaborative spatial multiplexing (CSM) or virtual spatial multiplexing (VSM), interference between signals received by the base station increases in accordance with increase of the number of users. For this reason, a problem may occur in that receiving throughput of the base station may be deteriorated. Accordingly, considering that several users transmit signals using the same resource region and the base station receives the signals at the same time, a method for controlling uplink transmission power is required.

In this case, one resource region means a resource region that can be divided by a time×frequency unit, and its size is variable. Also, although the resource region will be described based on an uplink signal in the present invention, it will be apparent to those skilled in the art to which the present invention pertains that the resource region can also be applied to power control of a downlink signal.

Hereinafter, a method for controlling uplink power in a MU-MIMO mode according to the embodiment of the present invention will be described based on an open loop power control scheme and a closed loop power control scheme.

<Open Loop Power Control>

In order to operate a user in a MU-MIMO mode while maintaining an interference level similar to that when an uplink signal is transmitted in a SIMO mode, there is provided a method of scaling a transmission power level of a user at a predetermined level. This scaling method can be implemented by reflecting the number of streams of the MU-MIMO mode, which are allocated to each user, on the related art power control method.

First of all, it is supposed that a first user transmits two streams $S_{01}$, $S_{02}$ to the base station through one resource region, a second user transmits one stream to the base station, and the maximum powers that can be used by the first user and the second user are 30 mW and 20 mW, respectively. In this case, in order to transmit one stream in case of a single user per allocated resources, the first user can transmit the stream at a power of 15 mW while the second user can transmit the stream at a power of 20 mW. However, in the case that the first user and the second user are operated in the MU-MIMO mode, namely, in the case that the first user and the second user transmit uplink signals through one resource region and the base station receives the uplink signals at the same time, interference, which additionally includes interference levels that may occur by the uplink signals, may occur in view of the base station.

Accordingly, the present invention suggests that the base station determines the transmission power by considering a total number of streams (TNS) received through the same resource region. If the SIMO mode is converted to the MU-MIMO mode, the present invention suggests that the transmission power per stream transmitted from the mobile station is determined in accordance with the following Equation 1.

First of all, the following Equation 1 illustrates that the transmission power of the open loop disclosed in the IEEE 802.16m standard document is set.

$$P_{tx} = PL + NI + SINR_{Target} + Offset_{perAMS} + Offset_{perABS} \quad \text{[Equation 1]}$$

In the Equation 1, $P_{Tx}$ denotes the transmission power level required to satisfy $SINR_{Target}$, PL denotes a path loss from the base station to the mobile station, and NI denotes an average power level of noise and interference received from the base station. $Offset_{perAMS}$ means a mobile station-specific (AMS-specific) offset value controlled by the base station, and $Offset_{perABS}$ means an offset value controlled by the mobile station, Also, $SINR_{Target}$ means a target signal to noise and interference ratio of the uplink signal.

Referring to the Equation 1, it is noted that PL, NI, $Offset_{perAMS}$ and $Offset_{perABS}$ are only compensation values and a main factor for determining the transmission power of the mobile station is $SINR_{Target}$. Also, $SINR_{Target}$ is determined by the following Equation 2.

$$SINR_{Target} = \quad \text{[Equation 2]}$$
$$10\log10\left(\max\left(10^{\wedge}\left(\frac{SINR_{min}}{10}\right), \gamma_{IoT} \times SINR_{DL} - \alpha\right)\right)[dBm]$$

$SINR_{min}$ means a minimum signal to noise and interference ratio, wherein the signal is signaled by the base station, and $SIR_{DL}$ means a signal to interference ratio measured by the mobile station. Also, $\gamma_{IoT}$ is an IoT control factor broadcasted by the base station, and α is a factor according to the number of receiving antennas of the base station.

The following Equation 3 illustrates that the transmission power is determined by reflecting the TNS value.

$$P_{tx}\_\text{perStream (mW)} = P_{tx}\_\text{SIMO}/f(TNS)[mW] \quad \text{[Equation 3]}$$

In the Equation 3, $P_{tx}\_SIMO$ means the transmission power determined under the assumption that the uplink signal is transmitted through one resource region regardless of the number of users, i.e., the transmission power in the SIMO mode. Since the main factor for determining the transmission power of the mobile station is $SINR_{Target}$, $P_{tx}\_SIMO$ is preferably $SINR_{Target}$ of the Equation 2.

$P_{tx}\_$perStream is the transmission power per stream intended by the present invention, and can mean a target signal to noise and interference ratio per stream $SINR_{Target\_stream}$ when supposing that $P_{tx}\_SIMO$ is $SINR_{Target}$ of the Equation 2.

Also, $f$(TNS) is a function having the number of streams received from the base station through the same resource region as a factor, and may be the number of streams, or a scaling factor may be added to the number of streams. $f$(TNS) serves to improve throughput by lowering an interference level that may occur in the base station in the MU-MIMO mode at a level similar to the interference level of the SIMO mode.

Referring to the Equation 3, in order to maintain the same interference level when one user transmits a transmission power, transmission powers for $S_{01}$ and $S_{02}$ of the first user and $S_{10}$ of the second user are divided by the TNS. Namely, the transmission powers of the first user and the second user are respectively adjusted by 30 mW/(TNS=3), 20 mW/(TNS=3).

The Equation 3 can be expressed by the following Equation 4 using dBm.

$$P_{tx}\_\text{perStream (dBm)} = P_{tx}\_\text{SIMO (dBm)} - f'(TNS) \quad \text{[Equation 4]}$$

Meanwhile, in the case that $P_{tx}\_SIMO$ is a function having a modulation and coding scheme (MCS) level as a factor, the uplink transmission power is preferably determined by the following Equation 5.

$$P_{tx}\_\text{perStream (dBm)} = P_{tx}\_\text{SIMO (dBm)} - f'(TNS, MCS) \quad \text{[Equation 5]}$$

If $P_{tx\_SIMO}$ is supposed to be $SINR_{Target}$ and $P_{tx\_per-Stream}$ is supposed to be $SINR_{Target\_stream}$, the Equation 4 can be expressed by the following Equation 6 using dBm.

$$SINR_{Target\_stream} = \qquad \text{[Equation 6]}$$
$$10\log10\left(\max\left(10^{\wedge}\left(\frac{SINR_{min}}{10}\right), \gamma_{IoT} \times SINR_{DL} - \alpha\right)\right) -$$
$$10\log_{10}TNS[dBm]$$

Based on the aforementioned concept, a method of obtaining transmission power per stream according to the open loop scheme will be described.

As one embodiment of the present invention, Equation 7 to Equation 10 will be described as follows.

In the following Equations, $P_{Tx\_stream}$ denotes transmission power level per stream, $PL_S$ denotes path loss from a serving cell to the mobile station, $PL_i$ denotes path loss from a cell having the greatest interference to the mobile station, and NI denotes an average power level of noise and interference received by the serving cell. Also, $SINR_{target}$ means a signal to noise and interference ratio to be desired for uplink signal transmission, $SINR_{min}$ means a minimum signal to noise and interference ratio, wherein the signal is signaled by the base station, and $SIR_{DL}$ means a signal to interference ratio measured by the mobile station. $Offset_{perAMS}$ means a mobile station-specific (AMS-specific) offset value controlled by the base station, and $Offset_{perABS}$ means an offset value controlled by the mobile station. Also, $MT_T$, means a total of streams received by the base station at the same time, and $\Delta IoT_{max}$ means the difference between $IoT_{max}$ and NI.

As described above, the values $SINR_{target}$, $SINR_{min}$, $IoT_{max}$, NI and $MT_T$ can be signaled periodically or non-periodically from the base station to the mobile station through a broadcast channel or from a super frame header (SFH) of FIG. 4 to the mobile station through an Uplink Advanced-MAP Information Element (UL A-MAP IE).

$$P_{tx} = PL_S + NI + \qquad \text{[Equation 7]}$$
$$\max(SINR_{min}, \min(SINR_{target}, \Delta IoT_{max} + N_0 + SIR_{DL})) +$$
$$offset_{perAMS} + offset_{perABS} - 10\log_{10}MT_T$$

$$P_{tx} = PL_S + NI + \max(SINR_{min}, \qquad \text{[Equation 8]}$$
$$\min(SINR_{target}, \Delta IoT_{max} + N_0 + SIR_{DL} - 10\log_{10}MT_T))$$

$$P_{tx} = PL_S + NI + \qquad \text{[Equation 9]}$$
$$\max(SINR_{min}, \min(SINR_{target}, \Delta IoT_{max} + N_0 + SIR_{DL}) +$$
$$offset_{perAMS} + offset_{perABS}) - 10\log_{10}MT_T$$

$$P_{tx} = PL_S + NI + \qquad \text{[Equation 10]}$$
$$\max(SINR_{min}, \min(SINR_{target}, \Delta IoT_{max} + N_0 + SIR_{DL} -$$
$$10\log_{10}MT_T) + offset_{perAMS} + offset_{perABS})$$

$-10 \log_{10} MT_T$ is always applied to the Equation 7 but may not be applied to the Equation 8 as the case may be. Likewise, $-10 \log_{10} MT_T$, is always applied to the Equation 9 but may not be applied to the Equation 10 as the case may be.

Another embodiment of the present invention will be described with reference to the following Equations 11 and 12.

$$P_{tx} = PL_S + NI + \max(SINR_{min}, \Delta IoT_{max} + N_0 + SIR_{DL}) + \qquad \text{[Equation 11]}$$
$$offset_{perAMS} + offset_{perABS} - 10\log_{10}MT_T$$

$$P_{tx} = PL_S + NI + \qquad \text{[Equation 12]}$$
$$\max(SINR_{min}, \Delta IoT_{max} + N_0 + SIR_{DL} - 10\log_{10}MT_T) +$$
$$offset_{perAMS} + offset_{perABS}$$

In the Equation 11, after $SINR_{min}$ is directly compared with $\Delta IoT_{max}+N_0+SIR_{DL}$, the greater value is used. $-10 \log_{10} MT_T$ is always applied to the Equation 12 but may not be applied to the Equation 9 as the case may be.

Another embodiment of the present invention will be described with reference to the following Equation 13.

$$P_{tx} = \max(P_{min}, \min(P_{tx1}, P_{tx2}))$$

$$P_{min} = SINR_{min} + NI + PL_S$$

$$P_{tx1} = SINR_{target} + NI + PL_S + offset_{perAMS} + offset_{perABS}$$

$$P_{tx2} = IoT_{max} + PL_S + N_0 + SIR_{DL} - 10\log_{10}MT_T \qquad \text{[Equation 13]}$$

In the Equation 13, $P_{min}$, $P_{tx1}$ and $P_{tx2}$ are mutually compared with one another to determine $P_{tx}$.

Figure 5:
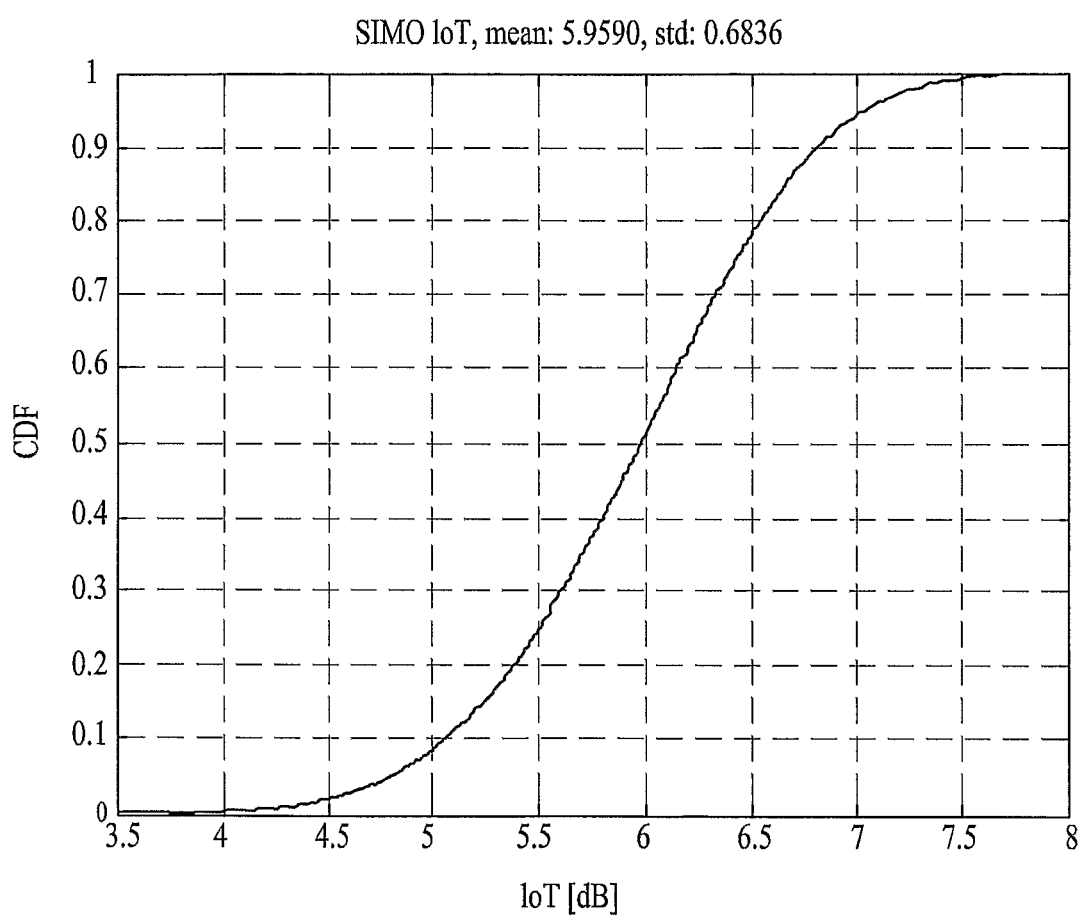
FIG. 5 is a diagram illustrating a cumulative distribution function (CDF) value according to interference over thermal noise (IoT) when a transmission power is determined by the related art method.
Figure 6:
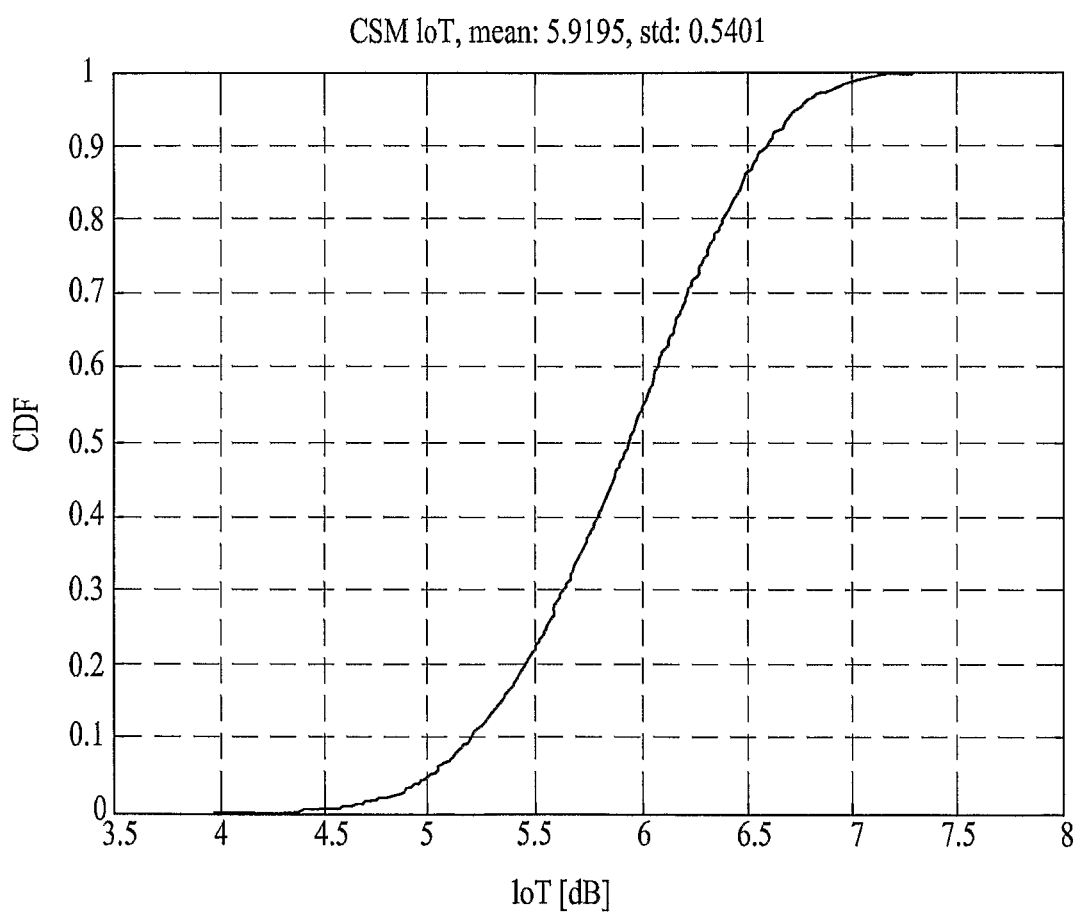
FIG. 6 is a diagram illustrating a cumulative distribution function (CDF) value according to interference over thermal noise (IoT) when a transmission power is determined by the related art method.

FIG. 5 is a diagram illustrating a cumulative distribution function (CDF) value according to interference over thermal noise (IoT) when a transmission power is determined by the related art method. FIG. 6 is a diagram illustrating a cumulative distribution function (CDF) value according to interference over thermal noise (IoT) when a transmission power is determined by the related art method. In FIG. 5 and FIG. 6, it is supposed that two users respectively transmit one stream.

Referring to FIG. 5 and FIG. 6, according to the power control method of the embodiment of the present invention, it is noted that a CDF value according to IOT level similarly occurs in both the case where one user transmits a signal and the case where two users transmit a signal at the same time. As a result, it is noted that the MU-MIMO can be implemented effectively even while the interference level is maintained similarly to that of the SIMO mode.

The following Table 2 respectively illustrates system throughput, cell edge user throughput, and IoT level in a SIMO mode, a MU-MIMO mode without consideration on the number of a total of streams, and a MU-MIMO mode with consideration on the number of a total of streams in accordance with the present invention.

TABLE 2

| | | SIMO | CSM without consideration on the number of streams | CSM with consideration on the number of streams |
|---|---|---|---|---|
| System throughput | | 2.5752 Mbps (0.70 bps/Hz) | 2.24 Mbps (0.602 bps/Hz) | 2.9231 Mbps (0.79 bps/Hz) |
| Cell edge user throughput | | 57.79 kbps (0.0156 bps/Hz) | 51.71 kbps (0.0140 bps/Hz) | 64.43 kbps (0.0174 bps/Hz) |
| IoT level | Mean | 5.959 | 6.3417 | 5.9195 |
| | Std. | 0.6836 | 0.7505 | 0.5401 |

<Closed Loop Power Control>

The following Equation 13 can be used to control the transmission power of the mobile station in accordance with a closed loop scheme.

$$P_{new} = P_{last} + TransmitPowerCommand(TPC) \qquad \text{[Equation 13]}$$

In other words, the mobile station receives a TPC message from the base station periodically or non-periodically, and determines new transmission power $P_{new}$ to be used in the future by considering the value included in the TPC message on the current transmission power $P_{last}$.

Figure 7:
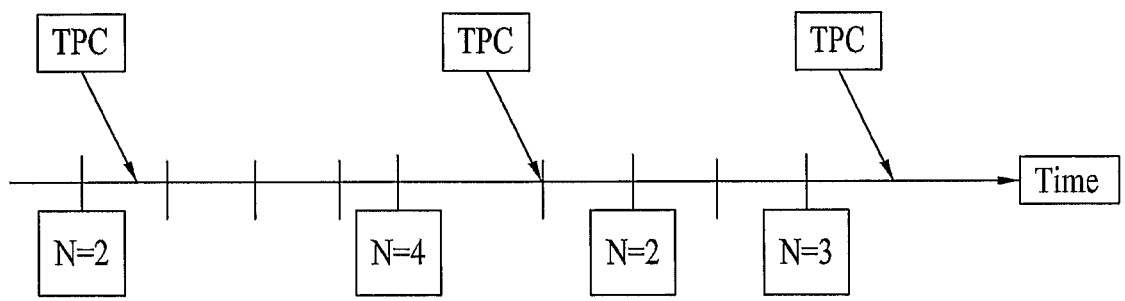
FIG. 7 is a diagram illustrating a problem of a closed loop power control method according to the related art.

FIG. 7 is a diagram illustrating a problem of a closed loop power control method according to the related art.

Referring to FIG. 7, if the number of users that use one resource at the same time is varied faster then the TPC message period, the closed loop power control method according to the related art cannot perform exact power control until the TPC message of next period is received from the base station. Accordingly, even in case of the closed loop power control method, the number of a total of streams transmitted from the mobile stations that use one resource should be considered separately from the TPC message.

After receiving information of the number of a total of streams from the base station, the mobile station reflects the information on the power control value calculated based on one user as expressed by the following Equation 14.

$$P_{new} = P_{last} - f'(TNS)[dBm] \quad \text{[Equation 14]}$$

The period for performing the power control can be applied to either a subframe unit or frame unit.

The TNS can be signaled by the base station per resource allocation unit, or can be set at the maximum number of streams. If the TNS is set at the maximum number of streams, the TNS may be different from the number of streams which are actually transmitted. However, since the number of streams which are actually transmitted is always smaller than the TNS, inter-signal interference can be controlled equally to or smaller than the case where one stream is transmitted.

The following Equations 15 and 16 illustrate a method of obtaining transmission power per uplink transmission stream in accordance with a closed loop scheme with consideration on the Equation 3.

$$P_{Tx} = P_{last} + \Delta_{SINR} + \Delta_{PowerAdjust} - 10\log_{10} MT_T [dBm] \quad \text{[Equation 15]}$$

$$P_{Tx\_Temp} = P_{last} + \Delta_{SINR} + \Delta_{PowerAdjust} [dBm] \quad \text{[Equation 16]}$$

$$P_{Tx} = \begin{cases} P_{Tx\_Temp} - 10\log_{10} MT_T, \text{if}(P_{Tx\_Temp} \leq P_{Inter-cell}) \\ P_{Inter-cell} - 10\log_{10} MT_T, \text{if}(P_{Tx\_Temp} > P_{Inter-cell}) \end{cases}$$

In the Equations 15 and 16, $\Delta_{SINR}$ means the difference in target SINR values between the current MCS level and new MCS level, and $\Delta_{PowerAdjust}$ is a transmission power adjustment value controlled by the base station.

Figure 8:
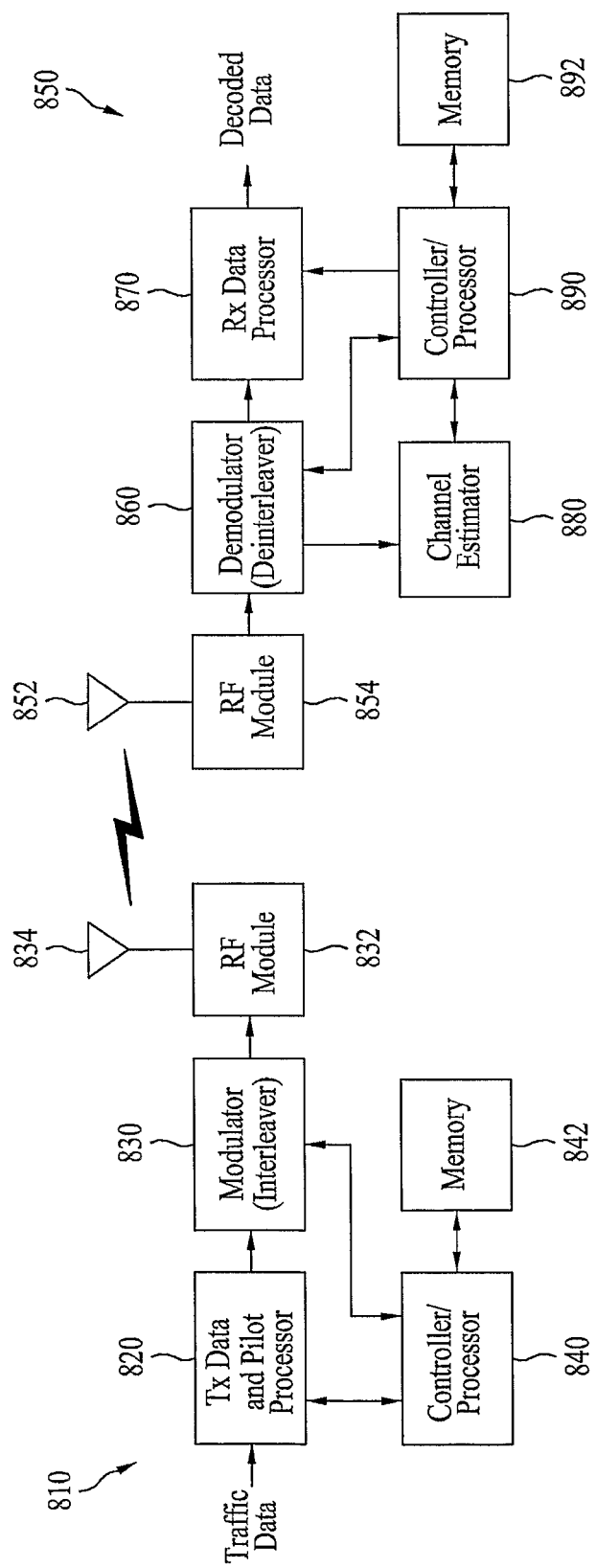
FIG. 8 is a block diagram illustrating a transmitter and a receiver according to one embodiment of the present invention.

FIG. 8 is a block diagram illustrating a transmitter and a receiver according to one embodiment of the present invention. In the downlink, the transmitter 810 is a part of the base station and the receiver 850 is a part of the mobile station. In the uplink, the transmitter 810 is a part of the mobile station and the receiver 850 is a part of the base station.

Referring to FIG. 8, a Tx data and pilot processor 820 of the transmitter 810 generates data symbols by encoding, interleaving and symbol-mapping data (for example, traffic data and signaling). Also, the processor 820 multiplexes the data symbols and pilot symbols by generating the pilot symbols. A modulator 830 generates transmission symbols in accordance with a wireless access scheme. Examples of the wireless access scheme include FDMA, TDMA, CDMA, SC-FDMA, MC-FDMA, OFDAM or their combination. Also, the modulator 830 allows data to be transmitted by being distributed in a frequency domain and a time domain using various permutation methods illustrated in the embodiment of the present invention. A radio frequency (RF) module 832 generates RF signals through an antenna 834 by processing (for example, analog conversion, amplification, filtering, and frequency uplink conversion) the transmission symbols.

In the receiver 850, an antenna 852 receives signals transmitted from the transmitter 810 and provides the received signals to an RF module 854. The RF module 854 provides input samples by performing signal processing (for example, filtering, amplification, frequency downlink conversion, and digitalization) for the received signals.

A demodulator 860 provides data values and pilot values by demodulating the input samples. A channel estimator 880 estimates a channel estimation value based on the received pilot values. Also, the demodulator 860 performs data detection (or equalization) for the received data values using the channel estimation value, and provides data symbol estimation values for the transmitter 810. The demodulator 860 can realign the data distributed in the frequency domain and the time domain in their original order by performing the reverse operation of the various permutation methods illustrated in the embodiment of the present invention. An Rx data processor 870 performs symbol demapping, deinterleaving and decoding for the data symbol estimation values and provides the decoded data.

Generally, in the receiver 850, processing of the demodulator 860 and the Rx data processor 870 is complementary to processing of the modulator 830 and the Tx data and pilot processor 820 in the transmitter 810.

Controller/processor 840 and 890 respectively manage and control the operation of various processing modules existing in the transmitter 810 and the receiver 850. Memories 842 and 892 respectively store program codes and data for the transmitter 810 and the receiver 850.

The modules illustrated in FIG. 8 are illustrative, and the transmitter and/or the receiver may further include necessary modules, wherein some modules/functions may be omitted or divided into different modules, or two or more modules may be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the mobile station may be replaced with terms such as user equipment (UE) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method for controlling uplink transmission power of a mobile station in a wireless communication system and an apparatus therefor.

The invention claimed is:

1. A method for setting uplink transmission power at a mobile station in a wireless communication system, the method comprising:
receiving, from a base station, information on a number of total streams; and
setting the uplink transmission power using the number of total streams,
wherein the uplink transmission power is transmission power per stream obtained by applying the number of total streams to a reference transmission power.

2. The method of claim 1, wherein the number of total streams is larger than a number of streams that are transmitted from the mobile station.

3. The method of claim 1, wherein setting the transmission power per stream comprises dividing the reference transmission power by the number of total streams.

4. The method of claim 1, wherein the reference transmission power comprises a target signal to interference and noise power ratio.

5. The method of claim 4, wherein the transmission power per stream comprises a target signal to interference and noise power ratio per stream.

6. The method of claim 5, wherein the target signal to interference and noise power ratio per stream (SINR$_{Target\_stream}$) is $$10\log10\left(\max\left(10^{\wedge}\left(\frac{SINR_{min}}{10}\right), \gamma_{IoT} \times SINR_{DL} - \alpha\right)\right) - 10\log_{10}TNS[dBm],$$

wherein SNR$_{min}$ is a SINR requirement for a minimum rate expected by the base station, SIR$_{DL}$ is a ratio of a downlink signal to interference power measured by the mobile station, $\gamma_{IoT}$ is an IoT control factor broadcast by the base station, α is a factor according to a number of receive antennas at the base station, and TNS is the number of total streams.

7. The method of claim 1, wherein the number of total streams is received through an UL A-MAP IE (Uplink Advanced-MAP Information Element) of a superframe header.

8. A mobile station comprising:
a receiving module for receiving, from a base station, information on a number of total streams; and
a processor for setting uplink transmission power using the number of total streams,
wherein the uplink transmission power is transmission power per stream obtained by applying the number of total streams to a reference transmission power.

9. The mobile station of claim 8, wherein the number of total streams is larger than a number of streams that are transmitted from the mobile station.

10. The mobile station of claim 8, wherein the processor divides the reference transmission power by the number of total streams for obtaining the transmission power per stream.

11. The mobile station of claim 8, wherein the reference transmission power comprises a target signal to interference and noise power ratio.

12. The mobile station of claim 11, wherein the transmission power per stream comprises a target signal to interference and noise power ratio per stream.

13. The mobile station of claim 12, wherein the target signal to interference and noise power ratio (SINR$_{Target\_stream}$) is $$10\log10\left(\max\left(10^{\wedge}\left(\frac{SINR_{min}}{10}\right), \gamma_{IoT} \times SINR_{DL} - \alpha\right)\right) - 10\log_{10}TNS[dBm],$$

wherein SINR$_{min}$ is a SINR requirement for a minimum rate expected by the base station, SINR$_{DL}$ is a ratio of a downlink signal to interference power measured by the mobile station, $\gamma_{IoT}$ is an IoT control factor broadcast by the base station, α is a factor according to a number of receive antennas at the base station, and TNS is the number of total streams.

14. The mobile station of claim 7, wherein the number of total streams is received through an UL A-MAP IE (Uplink Advanced-MAP Information Element) of a superframe header.

* * * * *